United States Patent
Driver et al.

(10) Patent No.: US 7,467,388 B2
(45) Date of Patent: Dec. 16, 2008

(54) MONITORING MESSAGE QUEUES AND STARTING PROCESSING APPLICATIONS

(75) Inventors: David O. Driver, Seattle, WA (US); Geoffrey M. Kizer, Seattle, WA (US); Krishnan Srinivasan, Kirkland, WA (US); Uday S. Hedge, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 142 days.

(21) Appl. No.: 11/285,496

(22) Filed: Nov. 22, 2005

(65) Prior Publication Data

US 2007/0118841 A1    May 24, 2007

(51) Int. Cl.
*G06F 9/54* (2006.01)
*G06F 9/46* (2006.01)
(52) U.S. Cl. .................. 719/314; 709/201; 709/206
(58) Field of Classification Search .................. None
See application file for complete search history.

(56) References Cited

U.S. PATENT DOCUMENTS

| | | | |
|---|---|---|---|
| 5,379,426 A | | 1/1995 | Foss et al. |
| 6,226,689 B1 | | 5/2001 | Shah et al. |
| 6,247,064 B1 | | 6/2001 | Alferness et al. |
| 6,425,017 B1 | * | 7/2002 | Dievendorff et al. ........ 719/315 |
| 6,459,706 B1 | | 10/2002 | Hayasaka |
| 6,665,814 B2 | | 12/2003 | Hobson et al. |
| 6,842,763 B2 | | 1/2005 | Kettley et al. |
| 2002/0087507 A1 | | 7/2002 | Hopewell et al. |
| 2003/0229725 A1 | | 12/2003 | Chen et al. |
| 2004/0128398 A1 | * | 7/2004 | Pettey ........................ 709/249 |
| 2004/0203614 A1 | * | 10/2004 | Qu et al. ................... 455/412.1 |
| 2004/0205769 A1 | * | 10/2004 | Ruutu ........................ 719/313 |
| 2004/0215718 A1 | * | 10/2004 | Kazmi et al. ............... 709/203 |
| 2005/0080759 A1 | * | 4/2005 | Brown et al. ................. 707/1 |
| 2005/0114867 A1 | | 5/2005 | Xu et al. |

(Continued)

FOREIGN PATENT DOCUMENTS

CA        2427362        5/2002

(Continued)

OTHER PUBLICATIONS

Proc. IFIP Working Conf on Info Sys for Decentralized Organizations, Trodheim, Aug. 1995 G. Alonso, C. Mohan, R. Günthör IBM Almaden Research Center D. Agrawal, A. El Abbadhi Computer Science Department, UC Santa Barbara M. Kamath Computer Science Department, UM at Amherst "Exotica/FMQM: A Persistent Message-Based Architecture for Distributed Workflow Management", pp. 1-18 Aug. 1995 http://nzdis.otago.ac.nz/download/other/staff/alonso94a.pdf.

(Continued)

*Primary Examiner*—William Thomson
*Assistant Examiner*—Abdou K Seye
(74) *Attorney, Agent, or Firm*—Workman Nydegger

(57) ABSTRACT

Allowing queue messages to be pulled by one or more applications. A method may be practiced, for example, in a computing environment including applications configured to receive messages from queues. The method includes correlating applications to queues by correlating queue names to application locations. A queue is monitored to discover new messages in the queue. The method further includes receiving a notification that a new message has been added to the queue. An indication is provided to an activation service to allow the activation service to activate an application correlated to the queue and to allow the application to pull the new message from the queue.

18 Claims, 2 Drawing Sheets

U.S. PATENT DOCUMENTS

2005/0183093 A1  8/2005  Pope et al.

OTHER PUBLICATIONS

Umeshwar Dayal, Meichun Hsu, and Rivka Ladin "Business Process Coordination: State of the Art, Trends, and Open Issues", 11 pages 2001 http://www.hpl.hp.com/research/papers/vldb2001.pdf.

Nalini Venkatasubramanian, Mayur Deshpande, Shivjit Mohapatra, Sebastian Gutierrez-Nolasco & Jehan Wickramasuriya "Design and Implementation of a Composable Reflective Middleware Framework", pp. 644-653 2001 IEEE http://ieeexplore.ieee.org/application/enterprise/entifilecabinet.jsp?ResultStart=0.

* cited by examiner

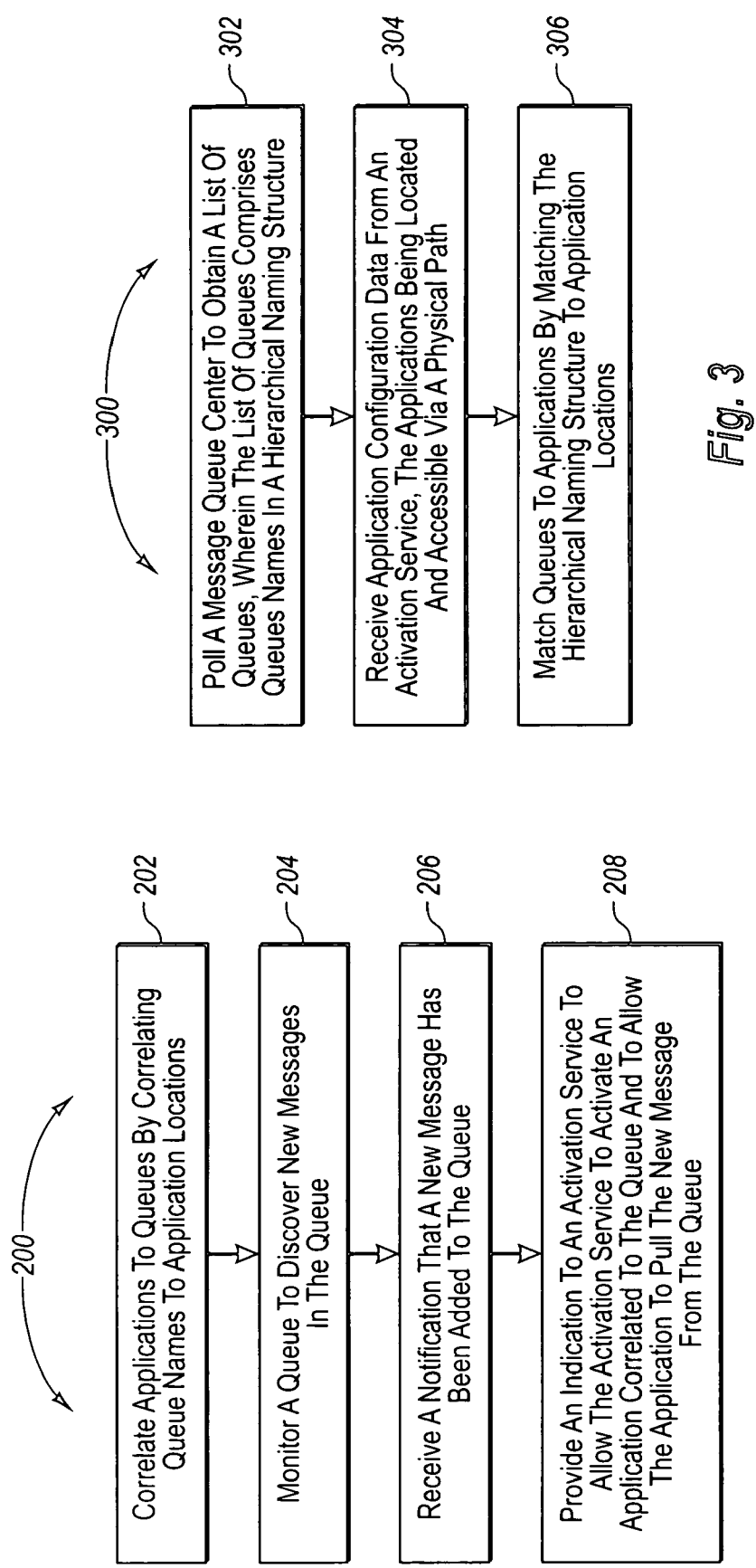

MONITORING MESSAGE QUEUES AND STARTING PROCESSING APPLICATIONS

BACKGROUND

Background and Relevant Art

Computers and computing systems have affected nearly every aspect of modern living. Computers are generally involved in work, recreation, healthcare, transportation, entertainment, household management, etc. Computers include one or more processors that run application code to implement applications that perform the computer functions. Typically, applications input data and output data. Data can be received by an application where the data can be operated on or be used to modify other data so as to implement various functions.

To receive input data, applications may receive the data through a queue. A queue may be implemented as a data structure that receives data and organizes the data for consumption by an application according to a set of rules. For example, a queue may receive data and store the received data in a fashion that allows the application to consume the received data in the order that it was received at the queue. Data queues serve as a buffer to store data while applications or processors running applications are busy performing other tasks. Additionally, data queues can mitigate the loss of data that may occur when different pieces of data are sent to an application at the same or a nearby time.

In one exemplary use of data queues, an application continuously polls a data queue to discover messages in the data queue for the application. Understandably, this example configuration may occupy valuable resources such as system memory, processor time etc.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method of allowing queue messages to be pulled by one or more applications. The method may be practiced, for example, in a computing environment including applications configured to receive messages from queues. The method includes correlating applications to queues by correlating queue names to application locations. A queue is monitored to discover new messages in the queue. The method further includes receiving a notification that a new message has been added to the queue. An indication is provided to an activation service to allow the activation service to activate an application correlated to the queue and to allow the application to pull the new message from the queue.

In another embodiment, a method of correlating queues to applications is disclosed. The method may be practiced, for example, in a computing environment including applications configured to receive messages from queues. The method include polling a message queue center to obtain a list of queues. The list of queues includes queues names in a hierarchical naming structure. Application configuration data is received from an activation service. The applications are located and accessible via a physical path. Queues are matched to applications by matching the hierarchical naming structure to application locations.

Yet another embodiment disclosed herein includes a system configured to allow queue messages to be pulled by one or more applications. The system may be used, for example, in a computing environment including applications configured to receive messages from queues. The system includes a message queue center. The message queue center includes one or more queues configured to receive messages for applications in the system. The system further includes an activation service. The activation service is configured to provide configuration information about applications to a listener adapter. The system further includes the listener adapter. The listener adapter includes a binding monitor configured to poll the message queue center to discover queues at the message queue center. The binding monitor is also configured to match applications to queues at the message queue center by comparing application locations with queue names. The listener adapter further includes a queue monitor for each queue matched to an application. The queue monitor is configured to monitor queues for new messages and to request activation of an application matched to a queue when new messages arrive in the queue matched to the application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 2 illustrates a method of allowing messages from queues to pulled by applications; and FIG. 3 illustrates a method of matching queues to application.

DETAILED DESCRIPTION

Figure 1:
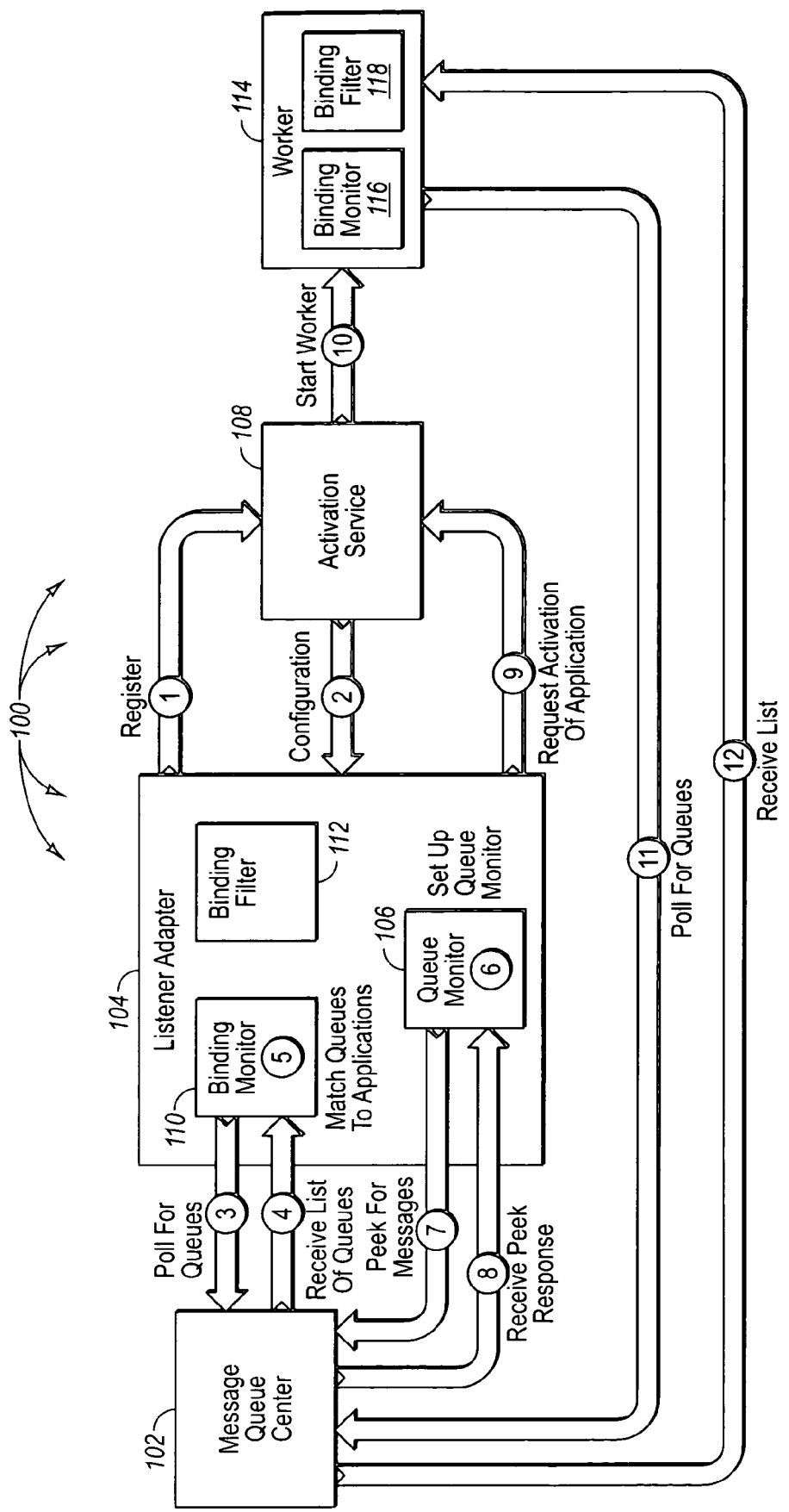
FIG. 1 illustrates an exemplary computer system illustrating one embodiment.

Embodiments herein may comprise a special purpose or general-purpose computer including various computer hardware, as discussed in greater detail below.

One embodiment described herein includes a listener adapter that monitors queues on behalf of applications. When the listener adapter discovers a new message for an application, the listener adapter alerts an activation service, which facilitates activation of the application. The activation service can also configure the application with appropriate knowledge about the queue, such as a location of the queue. The application can then pull the message from the queue and start any appropriate services to consume the message. In one embodiment, the queue uses a hierarchical naming structure that can be mapped to application locations. In this way, applications can use hierarchical naming to retrieve messages from queues.

Referring now to FIG. 1, an exemplary embodiment is illustrated. FIG. 1 shows a computer system 100. The computer system 100 includes a message queue center 102. The message queue center 102 may be a data structure that includes a number of queues for receiving messages for consumption by applications in the computer system 100. In one embodiment, the message queue center 102 may be implemented as a Microsoft® Message Queue center (MSMQ).

The computer system 100 further includes a listener adapter 104. The listener adapter 104 as described above includes functionality for monitoring queues in the message queue center 102. In one embodiment, the listener adapter 104 includes a software module which functions as a queue monitor 106. The queue monitor 106 is tasked with monitoring queues at the message queue center 102 to discover new messages in the queues at the message queue center 102.

An activation service 108 is connected to the listener adapter 104. When the queue monitor 106 discovers new messages in the message queue center 102, the activation service 108 can be notified such that the activation service 108 can activate an application for which the new message in the queue is available. In one embodiment, the activation service 108 may be embodied as Windows Activation Service (WAS) available from Microsoft Corporation of Redmond, Wash.

Illustrating now a more detailed description of the functionality of the computer system 100 shown in FIG. 1, the listener adapter 104 registers with the activation service 108 as illustrated by the arrow labeled 1. Registering with the activation service 108 may include notifying the activation service 108 that the listener adapter 104 is the protocol adapter for the message queue center 102. By registering the listener adapter 104 with the activation service 108 as the protocol adapter for the message queue center 102, the activation service 108 directs messages to and from the message queue center 102 to and from the listener adapter 104.

When the listener adapter 104 registers with the activation service 108, the activation service 108 provides configuration data to the listener adapter as illustrated by the arrow labeled 2. The configuration data may include information such as protocol information, name and/or path of applications using the message queue center protocol, and machine information specifying where queues are located. Queues are often located at the local host, thus the activation service often provides an indication that the local host is the machine where queues for applications managed by the activation service 108 are located. As will be described in more detail below, registering with the activation service also results in the creation of a binding filter 112 that corresponds to each application using message queue center protocols.

The listener adapter 104 then ensures that a binding monitor 110 is configured for each machine. For example, if queues for the applications managed by the activation service 108 exist only on the local host, then a single binding monitor 110 for the local host will be configured for the local host. When queues are located at other remote machines, a binding monitor 10 will be configured for each remote machine.

As illustrated in FIG. 1, a binding monitor 110 will poll for queues at the message queue center 102 as illustrated by the arrow labeled 3. The message queue center 102 returns a list of queues at the message queue center 102 which is received by the binding monitor 110 as illustrated by the arrow labeled 4. The binding monitor 110 may continuously poll the message queue center 102 to discover new queues at the message queue center 102. In one embodiment, the binding monitor 110 associates applications with queues. This may be accomplished by correlating queues discovered in the message queue center 102 with binding filters 112 established during the configuration step illustrated by the arrow labeled 2.

At the listener adapter 104, the binding filter 112 is configured for each application managed by the activation service 108 that communicates using message queue center protocols. The label 5 at the binding monitor 110 illustrates an action of matching queues to applications. In one embodiment, and as discussed in more detail below, matching queues to applications involves a process whereby queue names in the form of URIs are mapped to disk locations of applications managed by the activation service 108. As explained previously, this may be accomplished by matching queues at the message queue center 102 with binding filters 112 established for each of the applications managed by the activation service 108.

A queue monitor 106 is set up for each queue in the message queue center 102 as illustrated by the label 6 at the queue monitor 106. Each queue monitor 106 monitors each queue in the message queue center 102 to discover new messages in the queue. As illustrated by the arrow labeled 7, the queue monitor 106 peeks for messages at a queue in the message queue center 102. In one embodiment, the peeks may be asynchronous. In response to the peek, a peek response is received by the queue monitor 106 as illustrated by the arrow labeled 8. The queue monitor 106 includes a reference back to an application that is interested in the queue being monitored by the queue monitor 106 such that if the peek response indicates that a new message has been received in a queue for an application, a request for activation of an application is sent to the activation service 108 as illustrated by the arrow labeled 9.

The activation service 108 may then start a worker 114 to activate the application for which the new message in the queue is directed. As illustrated in FIG. 1, the worker also includes a binding monitor 116 and a binding filter 118. The binding monitor 116 and binding filter 118 comprise similar functionality to the binding monitor 110 and binding filter 112 in the listener adapter 104. In some embodiments, the binding monitor 116 and binding filter 118 at the worker 114 may simply be additional running instances of the same executable code for the binding monitor 110 and the binding filter 112.

As illustrated by the arrow labeled 11, the binding monitor 116 at the worker 114 polls the message queue center 102 for queues at the message queue center 102. The message queue center 102 returns a list of queues at the message queue center 102 which is received by the worker 114 as illustrated by the arrow labeled 12. The worker 114 illustrated in FIG. 1 is shown as including the binding monitor 116 and binding filter 118. Because the worker 114 represents a single application managed by the activation service 108, the worker 114 includes only a single binding filter 118 corresponding to the application to which the worker 114 corresponds. At the worker 114, a matching process similar to that performed at the listener adapter 104 is performed on the list of queues received at the worker 114. The worker 114, and in particular the binding monitor 116, correlate queues in the list of queues received from the message queue center 102 to the application corresponding to the binding filter 118.

Each queue includes information that corresponds to a service of the application. For example, the activation service 108 has a configuration file that maps an application to a physical address. For example, the application /myapp may be mapped to the hard drive location at c:\foo. The queue name may have a name that corresponds to the application. For example, a queue may have a name myapp/a/b/bar.svc. As such, the service path for the queue is c:\foo\a\b\bar.svc. In this example, that application prefix is replace by the physical path and mapped to a file. Thus, the worker 114 can determine that a service exists for queues matching the binding filter 118. If such a service exists, the worker 114 starts the service to consume messages at a queue at the message queue center 102. In some situations a service may not exist for the queue. This may occur because of matching that is performed by the binding monitor 110 to match queues to applications. As will be explained below in more detail, one embodiment uses a best match matching such that a queue may be selected as one that should be monitored even when an application or service is not registered with the activation service 108 for the queue. When this occurs, no service will be started for the new message at the queue.

Once an application has been activated to process messages in a queue at the message queue center 102, the application can assume responsibility for discovering and retrieving messages at the queue at the message queue center 102 so long as the application is active. Thus, in one embodiment, when the listener adapter 104 is aware that an application is monitoring queues at the message queue center 102, the listener adapter can ignore those queues so long as the application is active. At a subsequent time the application may determine that it should shut down. At that point, the application can inform the activation service, which in turn informs the listener adapter 104 that the application is shutting down such that the listener adapter 104 can again peek for messages, as illustrated by arrow 7, while the application is in a shut down state.

As alluded to previously, embodiments include functionality for correlating applications to queues at the message queue center 102. Notably, some embodiments allowing for multiple queues to be mapped to a single application. In one embodiment, the activation service 108 may be configured to operate using uniform resource indicators (URIs). Thus, in one embodiment, to correlate queues with applications, a mechanism may be used to match names in a flat namespace to hierarchical names such as those used in a web application namespace. For example, the readers attention is directed to the following mapping:

/my_app=>c:\foo

In this example, the namespace my_app is mapped to the physical hard drive directory at c:\foo. The directory at c:\foo may contain an application named my_app.exe and several services labeled svc1.svc, svc2.svc, svc3.svc, etc. Each queue that is intended to receive messages for my_app.exe can be labeled with a hierarchical name in the namespace my_app. For example, a queue named my_app/svc1.svc is intended to provide messages to the application my_app stored at the directory c:\foo. More particularly, messages at my_app/svc1.svc will be consumed by a service svc1.svc at the directory c:\foo. In this way, applications can be mapped to multiple queues.

Additionally, this type of hierarchical naming may be used in some embodiments to implement web application type messaging. In one particular embodiment, Web Services may be used to implement messaging within a system. Web Services is a standardized way of integrating applications. Standardized XML documents can be used with SOAP (Simple Object Access Protocol) messages and WSDL (Web Services Description Language) descriptions to integrate applications without an extensive knowledge of the applications being integrated.

Because of redundancies that may exist in application naming, the binding monitor 110 may include functionality to perform a best match matching of queues to applications. For example, consider a queue that is named myapp/a/b/x.svc. In the same system are three applications at c:\foo\a, c:\foo\a\b, and c:\foo\b. Various rules may be used to match the name of the queue with an appropriate application. For example, one set of rules may count the number of matching parameters in the prefix to identify the best match. An application with the longest matching prefix to the queue name will own the queue. Typically, this set of rules also specifies that a root parameter must be the same between the name and the application location for any score to be assigned. As such, in the example set forth above, c:\foo\a receives a score of 2 when compared with a/b/x.svc because c:\foo\a matches the root portion (/a) of the name. c:\foo \a\b receives a score of 4 because c:\foo \a\b matches the root portion and the next subsequent portion. c:\foo \b receives a score of 0 because c:\foo \b does not have a matching root parameter. Thus, an application at c:\foo \a\b will be correlated to the queue /a/b/x. svc.

Returning now to the actions illustrated by arrows 3 and 4, additional functionality of the binding monitor 110 will be illustrated. The binding monitor 110 may perform either in a static or dynamic fashion. When performing in a static fashion, the binding monitor 110 polls for queues at the queue message center 102 and receives a list of queues a single time. In an alternative embodiment, the binding monitor 110 acts in a dynamic fashion. In this example, the binding monitor 110 may poll for queues and receive a list of queues continuously over a period of time. This may be performed according to a periodic function, a random function, or other appropriate polling and message receiving method. As the binding monitor 110 discovers new queues and/or new applications as represented by binding filters 112, the binding monitor can reevaluate matches of queues to applications. Thus, if a queue-application pair becomes available with a longer prefix match than a previous queue-application pair, the binding monitor 110 can dynamically re-associate queues and application to have better prefix matches.

Referring now to FIG. 2, one embodiment herein includes a method 200 of allowing queue messages to be pulled by one or more applications. The method may be practiced, for example, in a computing environment including applications configured to receive messages from queues. The method 200 includes an act of correlating applications to queues by correlating queue names to application locations (act 202).

As described previously, in one embodiment correlating applications to queues (act 202) may be performed by performing a best match matching on the prefix of the queue name and the application. For example, the queue names may include a hierarchical name such as a URI. By comparing the hierarchical name with a storage location of applications, queues can be matched to applications. A best match matching process may include, for example, giving ownership of a queue to an application with the longest matching prefix as described previously herein. In one embodiment, two or more queues may be correlated to a single application. Queues can be named such that more than one queue can correspond to one application.

The method 200 further includes an act of monitoring a queue to discover new messages in the queue (act 204). As illustrated in FIG. 1 and discussed in more detail above, a listener adapter 104 may include a queue monitor 106. The queue monitor 106 may include functionality to monitor a message queue center 102.

The method 200 includes an act of receiving a notification that a new message has been added to the queue (act 206). As shown in FIG. 1, a peek response is received by the queue monitor 106. The peek response may include a notification that a new message has been added to the queue.

The method 200 includes an act of providing an indication to an activation service (act 208) to allow the activation service to activate an application correlated to the queue and to allow the application to pull the new message from the queue. As illustrated in FIG. 1, the listener adapter 104 requests activation of an application at arrow 9. Requesting activation of an application may provide the indication to the activation service (act 208) to allow the activation service to active an application. The application may then pull messages from any corresponding queues. As described previously, the queue monitor 106 may include information about an application location so as to be able to provide the activation service 108 with an indication about which application should be activated.

In one embodiment the method 200 may further include activating a service corresponding to the queue name. For example, the queues may include hierarchical naming that includes not only information corresponding to an application, but also information corresponding to a service at the application. Thus, the queue naming may provide functionality for activating services for queues.

In one embodiment the method of 200 may further include polling for queues at a message queue center; receiving an indication of queues at the message queue center and setting-up a queue monitor for individual queues correlated to applications at the message queue center to monitor queues. As illustrated in FIG. 1 the binding monitor 110 may poll for queues as illustrated by the arrow labeled 3. An indication of the queues available at the message queue center 102 may be received by the reception of a list of queues as illustrated by the arrow labeled 4. The listener adapter 104 may have an indication of applications using the message queue center protocol such as by in one embodiment having a binding filter 112 for each application using the message queue center protocol. As such, the listener adapter 104 can set up a queue monitor 106 for each queue discovered when polling for queues correlated to an application such as by being correlated to a binding filter 112.

The method 200 may further include registering with the activation service as the protocol adapter for a message queue center comprising the queue, and receiving configuration data for applications managed by the activation service. Referring again to FIG. 1, the listener adapter 104 can register with the activation service 108 as illustrated by the arrow labeled 1. In one embodiment, registering includes registering with the activation service 108 as the protocol adapter for a message queue center protocol. The activation service 108 returns configuration data as illustrated by the arrow labeled 2. The configuration data for applications managed by the activation service 108 may include at least one of protocol information, name and/or path of applications using the message queue center protocol, and machine information specifying a machine where queues are located. For example, the activation service 108 may provide configuration data that indicates that an application uses the message queue center protocol, a physical disk drive path for the application, and an indication of the machine, such as in one embodiment the local host, where the application resides.

The method 200 may further include an act of transmitting messages using Web Services. As described previously, Web Services includes a messaging system that allows computer systems and applications to communicate without advanced knowledge of the inner workings of the computer systems and applications.

Referring now to FIG. 3, another embodiment is illustrated which includes a method 300 of correlating queues to applications. The method may be practiced, for example, in a computing environment including applications configured to receive messages from queues. The method 300 includes an act of polling a message queue center to obtain a list of queues (act 302), wherein the list of queues comprises queues names in a hierarchical naming structure. For example, the hierarchical naming structure may include names that include a URI. As illustrated in the examples above, one exemplary hierarchal name may be myapp/a/b/x.svc.

The method 300 further includes an act of receiving application configuration data from an activation service (304), the applications being located and accessible via a physical path. For example, Referring to FIG. 1 the activation service 108 may provide configuration data as illustrated by the arrow labeled 2. The configuration data may include a physical path where an application may be stored. For example, the path may be c:\foo \a\b.

The method 300 further includes an act of matching queues to applications by matching the hierarchical naming structure to application locations (act 306). In one embodiment, matching queues to applications (act 306) includes matching using a best match method by matching prefix parameters of the queue names and application locations. As described previously, a score may be a assigned to matches of prefixes of hierarchical queue names and application locations to discover a best match. In the example above, a queue that is named myapp/a/b/x.svc is compared to three applications at c:\foo \a, c:\foo \a\b, and c:\foo \b. Of the applications, the application at c:\foo \a receives a score of 2, the application at c:\foo \a\b receives a score of 4, and the application at c:\foo \b receives a score of 0. As such, the application at c:\foo \a\b is correlated to the queue- named myapp/a/b/x.svc.

In the method 300 illustrated at FIG. 3, matching queues to applications (act 306) may be performed such that queues may be matched to a specific service at an application location. For example, the queue named myapp/a/b/x.svc may be matched to a service at the location of the application c:\foo \a\b where the service is named x.svc.

In the method to 300 illustrated at FIG. 3, matching queues to applications (act 306) may be performed dynamically so as to create better matches of applications and queues when new applications and/or queues are added to the system. For example, and referring again to FIG. 1, the binding monitor 110 may continuously poll for queues as illustrated by arrow 3 and receive lists of queues as illustrated by arrow 4. As new queues are added to the message queue center 102, the binding monitor 110 will become aware of these new queues. Additionally, the activation service 108 may continue to provide configuration data as illustrated by arrow 2. When new queues are recognized and/or new applications are recognized, the binding monitor can perform functions to re-match queues and applications so as to create the best matching between queues and applications.

In the method 300 illustrated at FIG. 3, matching queues to applications (act 306) may be performed by matching queues to binding filters. For example, as shown in FIG. 1, the activation service 108 may provide configuration data as illustrated by arrow two to the listener adapter 104. The configuration data may include an indication of applications using the message queue center protocol. The listener adapter 104 can then prepare a binding filter 112 for each application using the message queue center protocol. As such, binding filters 112 can be used to correlate applications to queues.

In the method 300 illustrated at FIG. 3, matching queues to applications (act 306) may be performed by matching an application to two or more queues. As described previously, the queues may be hierarchically named such that one application may be correlated to one or more queues. Additionally the queues can include naming that allows them to reference a specific service at the application location.

The method 300 may further include setting up a queue monitor for each queue matched to an application. For example, and referring again to FIG. 1 when a queue from the queue- message center has been correlated to an application, the listener adapter 104 may set up a queue monitor 106 for each queue that has been correlated to an application. The queue monitor 106 can monitor queues to discover new messages in the queues. This allows the listener adapter to request activation of an application by the activation service 108 as illustrated by the arrow labeled 9.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment including applications configured to receive messages from queues, a method of allowing queue messages to be pulled by one or more applications, the method comprising:

registering with an activation service a protocol adapter for a message queue center comprising a queue;

receiving configuration data for applications managed by the activation service, wherein the configuration data for applications managed by the activation service comprises at least one of protocol infonriation, name and/or path of applications using the message queue center protocol, or machine information specifying a machine where queues are located;

correlating applications to queues by correlating queue names, the queue names including prefixes to application paths by correlating portions of the prefixes to portions of the paths by matching prefix elements to path elements:

monitoring the queue to discover new messages in the queue;

receiving a notification that a new message has been added to the queue; and providing an indication to the activation service to allow the activation service to activate an application correlated to the queue by using an application path correlated to the queue name by matching prefix elements to path elements on an element basis and to allow the application to pull the new message from the queue.

2. The method of claim 1, further comprising activating a service corresponding to the queue name.

3. The method of claim 1, further comprising:

polling for queues at a message queue center;

receiving an indication of queues at the message queue center;

setting-up a queue monitor for individual queues correlated to applications at the message queue center to monitor queues.

4. The method of claim 1, wherein correlating applications to queues is performed by performing a best match matching on the prefixes of the queue names and the application paths.

5. The method of claim 4, wherein two or more queues are correlated to a single application.

6. The method of claim 1, wherein the queue name comprises a uniform resource indicator (URI).

7. The method of claim 1, wherein the queue name comprises a hierarchical name.

8. The method of claim 1, further comprising transmitting messages using Web Services.

9. In a computing environment including applications configured to receive messages from queues, a method of correlating queues to applications, the method comprising:
   registering with an activation service a protocol adapter for a message queue center comprising a queue;
   polling a message queue center to obtain a list of queues, wherein the list of queues comprises queues names including prefixes using a hierarchical naming structure;
   receiving application configuration data from the activation service, the applications being located and accessible via a physical path, wherein the configuration data for applications managed by the activation service comprises ai least one of protocol information, name and/or path of applications using the message queue center protocol, or machine information specifying a machine where queues are located;
   correlating queues to applications by correlating elements of prefixes of the hierarchical naming structure to elements of application paths on an element basis.
   monitoring the queue to discover new messages in the queue;
   receiving a notification that a new message has been added to the queue; and
   providing an indication to the activation service to allow the activation service to activate an application correlated to the queue by using an application path correlated to the queue name by matching prefix elements to path elements on an element basis and to allow the application to pull the new message from the queue 10. The method of claim 9, wherein the hierarchical naming structure comprises a uniform resource indicator (URI).

11. The method of claim 9, wherein correlating queues to applications comprises correlating using a best match method by correlating portions of prefixes of the queue names and application paths.

12. The method of claim 9, wherein queues may be correlated to a specific service at an application location.

13. The method of claim 9, wherein correlating is performed dynamically so as to create better correlations of applications and queues when new applications and/or queues are added to a system.

14. The method of claim 9, wherein correlating queues to applications by correlating the portions of prefixes of the hierarchical naming structure to application paths comprises correlating queues to binding filters.

15. The method of claim 9, further comprising setting up a queue monitor for each queue correlated to an application.

16. The method of claim 9, wherein correlating queues to applications comprises correlating an application to two or more queues.

17. In a computing environment including applications configured to receive messages from queues, a computer storage medium including computer executable instructions to implement a system configured to allow queue messages to be pulled by one or more applications, the computer storage medium comprising:
   computer executable instruction configured to implement a message queue center, the message queue center comprising one or more queues configured to receive messages for applications in the system, computer executable instructions further configured to register with an activation service a protocol adapter for a message queue center comprising a queue;
   computer executable instruction configured to implement an activation service, wherein the activation service is configured to provide configuration information about applications to a listener adapter, wherein the configuration data for applications managed by the activation service comprises at least one of protocol information, name and/or path of applications using the message queue center protocol, or machine information specifying a machine where queues are located; and
   computer executable instruction configured to implement the listener adapter. wherein the listener adapter comprises:
      a binding monitor configured to poll the message queue center to discover queues at the message queue center, the binding monitor further being configured to correlate applications to queues at the message queue center by comparing application paths with queue names, wherein the queue names include prefixes, and wherein comparing application paths with queue names comprises correlating elements of application paths with elements of queue name prefixes on an element basis; and
      a queue monitor for each queue correlated to an application, wherein the queue monitor is configured to monitor queues for new messages and to request activation of an application correlated to a queue when new messages arrive in the queue correlated to the application.

18. The computer storage medium of claim 17, wherein the queue names comprise uniform resource indicators (URIs).

* * * * *